US012628845B2

(12) United States Patent
Nishimura et al.

(10) Patent No.: US 12,628,845 B2
(45) Date of Patent: May 19, 2026

(54) OIL AND FAT COMPOSITION FOR HEAT COOKING

(71) Applicant: J-OIL MILLS, Inc., Tokyo (JP)

(72) Inventors: Saki Nishimura, Tokyo (JP); Mari Nishimura, Tokyo (JP); Masayoshi Sakaino, Tokyo (JP); Ryo Okabe, Tokyo (JP); Takashi Sano, Tokyo (JP)

(73) Assignee: J-OIL MILLS, Inc., Tokyo (JP)

( * ) Notice: Subject to any disclaimer, the term of this patent is extended or adjusted under 35 U.S.C. 154(b) by 837 days.

(21) Appl. No.: 17/413,755

(22) PCT Filed: Dec. 10, 2019

(86) PCT No.: PCT/JP2019/048255
§ 371 (c)(1),
(2) Date: Jun. 14, 2021

(87) PCT Pub. No.: WO2020/137516
PCT Pub. Date: Jul. 2, 2020

(65) Prior Publication Data
US 2022/0046940 A1      Feb. 17, 2022

(30) Foreign Application Priority Data

Dec. 28, 2018    (JP) ................................. 2018-246808
May 23, 2019    (JP) ................................. 2019-096578

(51) Int. Cl.
*A23D 9/00*         (2006.01)
*A23L 5/10*         (2016.01)
*A23L 29/00*        (2016.01)

(52) U.S. Cl.
CPC .................................... *A23D 9/00* (2013.01); *A23L 5/11* (2016.08); *A23L 29/04* (2016.08)

(58) Field of Classification Search
CPC .. A23D 9/00; A23D 29/04; A23D 5/11; A23L 29/04; A23L 5/11
See application file for complete search history.

(56) References Cited

U.S. PATENT DOCUMENTS

| | | | |
|---|---|---|---|
| 2002/0081368 A1 | 6/2002 | Kudo et al. | |
| 2007/0243307 A1 | 10/2007 | Abril et al. | |
| 2015/0223483 A1* | 8/2015 | Syed ........................ | A23D 9/00 426/607 |

FOREIGN PATENT DOCUMENTS

| | | | |
|---|---|---|---|
| JP | 61-119138 A | 6/1986 |
| JP | 4-365445 A | 12/1992 |
| JP | 6-133707 A | 5/1994 |
| JP | 8-242767 A | 9/1996 |
| JP | 2002-136268 A | 5/2002 |
| JP | 2003-79315 A | 3/2003 |
| JP | 2004-254588 A | 9/2004 |
| JP | 2007-244217 A | 9/2007 |
| JP | 2008-212003 A | 9/2008 |
| JP | 2013-81477 A | 5/2013 |
| JP | 2016-140260 A | 8/2016 |
| JP | 2016-187363 A | 11/2016 |
| JP | 2018-7572 A | 1/2018 |

OTHER PUBLICATIONS

"Docosahexaenoic Acid (DHA) Algal Oil". Available online at https://www.ams.usda.gov/sites/default/files/media/DHA%20Algal%20Oil%20TR.pdf (Year: 2011).*
Dubois et al., "Fatty acid profiles of 80 vegetable oils with regard to their nutritional potential" Eur. J. Lipid Sci. Technol. 109 (2007) 710-732. (Year: 2007).*
Notice of Written Submission of Publications dated Feb. 14, 2023 for corresponding Japanese Patent Application No. 2019-096578; English machine translation.
"Eat high-quality oil filled with the vitality of plants and become more beautiful Released two types of "Beauty Balance Omega Oil"", Pola Newsrelese, Feb. 9, 2017; English machine translation.
Sasada et al., "The Usage of Perilla Oil as Oil for Fry", Bulletin of Morioka Junior College Iwate Prefectural University, 2012, No. 14, pp. 1-9; English abstract.
PCT International Preliminary Report On Patentability (Chapter I) dated Mar. 10, 2020 filed in PCT/JP2019/048255; English translation.
International Search Report (ISR) dated Mar. 10, 2020 filed in PCT/JP2019/048255.

* cited by examiner

*Primary Examiner* — Erik Kashnikow
*Assistant Examiner* — Assaf Zilbering
(74) *Attorney, Agent, or Firm* — RANKIN, HILL & CLARK LLP

(57)         ABSTRACT

Provided are an oil and fat composition for heat cooking that has an exceptional effect of suppressing negative aspects caused by using edible oil and fat in heat cooking, and an edible material for the same.
This oil and fat composition for heat cooking contains an n-3 edible oil and fat in which the amount of n-3 fatty acid in the total amount of constituent fatty acids is 30 mass % or more and 80 mass % or less, and a base oil and fat consisting of an edible oil and fat other than the n-3 edible oil and fat, the oil and fat composition being characterized in that 0.01 mass % or more and less than 1 mass % of the n-3 edible oil and fat is contained in the oil and fat composition.

14 Claims, No Drawings

OIL AND FAT COMPOSITION FOR HEAT COOKING

TECHNICAL FIELD

The present invention relates to an oil and fat composition for heat cooking used in heat cooking.

BACKGROUND ART

Rapeseed oil, soybean oil, corn oil, sesame oil, and other edible oils and fats are used for fry cooking, stir-fry cooking, and other heat cooking. When food ingredients are heat cooked with an edible oil and fat, the unique flavor derived from the edible oil and fat can improve the palatability of foods, yet there are certain disadvantages in that the flavor of the oil after heat cooking results in an unpleasant odor, and there is a greater perception of aftertaste such as oil remaining in the mouth when eaten.

With regard to such problems, flavors and flavor oils have conventionally been added to the oil and fat in order to reduce the oily odor of oil and fat, and foods that use the same. For example, it has been proposed that a laurel oil-soluble extract or peppermint oil be added in order to alleviate the oily odor of oil and fat containing docosahexae-noic acid, eicosapentaenoic acid, or another ω3 polyunsaturated fatty acid (Patent Documents 1 and 2). It has additionally been proposed that a concentrate of tea extract be added to reduce the oily odor of vegetable-containing fried foods made from processed fish meat, and sake lees be added to mask the oily odor of oil-fried instant noodles (Patent Documents 3 and 4).

Meanwhile, Patent Document 5 indicates that it is possible to impart a moderate flavor and richness to heat-cooked foods by using flaxseed oil, perilla oil, Shiso oil, etc. (Patent Document 5, see paragraph [0011]).

RELATED ART DOCUMENTS

Patent Documents

Patent Document 1: Japanese Laid-Open Patent Application No. H08-242767
Patent Document 2: Japanese Laid-Open Patent Application No. H06-133707
Patent Document 3: Japanese Laid-Open Patent Application No. 2008-212003
Patent Document 4: Japanese Laid-Open Patent Application No. 2007-244217
Patent Document 5: Japanese Laid-Open Patent Application No. 2018-7572

DISCLOSURE OF THE INVENTION

Problems the Invention is Intended to Solve

However, the method of adding an auxiliary agent having a relatively strong flavor as in Patent Documents 1 to 4 may affect the flavor of food. Further, the purpose of the technique described in Patent Document 5 is to impart a moderate flavor and richness to fried foods, and is not means for suppressing adverse aspects caused by the use of edible oil and fat for heat-cooking such as frying.

Therefore, an object of the present invention is to provide an oil and fat composition for heat cooking that exceptionally be effective in suppressing the adverse aspects caused by using edible oil and fat in heat cooking, and provide an edible material for the same.

Means for Solving the Aforementioned Problems

A first aspect of the present invention provides an oil and fat composition for heat cooking containing an n-3 edible oil and fat in which the amount of n-3 fatty acids contained in the total amount of constituent fatty acids is 30 mass % or more and 80 mass % or less, and a base oil and fat consisting of an edible oil and fat other than the n-3 edible oil and fat, the oil and fat composition being characterized in that 0.01 mass % or more and less than 1 mass % of the n-3 edible oil and fat is contained in the oil and fat composition.

In the oil and fat composition for heat cooking, the n-3 edible oil and fat is preferably one or more oils and fats selected from the group consisting of perilla oil, flaxseed oil, Shiso oil, oil and fat containing DHA, and oil and fat containing EPA.

In the oil and fat composition for heat cooking, the base oil and fat preferably contains one or more oils and fats selected from the group consisting of rapeseed oil, corn oil, soybean oil, and palm olein.

In the oil and fat composition for heat cooking, the heat cooking is preferably frying or stir-frying.

A second aspect of the present invention provides a method of manufacturing an oil and fat composition for heat cooking including a step for mixing an n-3 edible oil and fat in which the amount of n-3 fatty acids contained in the total amount of constituent fatty acids is 30 mass % or more and 80 mass % or less, and a base oil and fat consisting of an edible oil and fat other than the n-3 edible oil and fat, the method of manufacturing an oil and fat composition being characterized in that 0.01 mass % or more and less than 1 mass % of the n-3 edible oil and fat is contained in the oil and fat composition for heat cooking.

A third aspect of the present invention provides a method of manufacturing a heat-cooked food, characterized in that the method includes a step for heat cooking a food ingredient using the oil and fat composition for heat cooking described above.

A fourth aspect of the present invention provides a method of reducing oiliness of heat-cooked food in which a food ingredient is heat cooked using the oil and fat composition for heat cooking described above.

A fifth aspect of the present invention provides a method of reducing an odor of a heat-cooked food in which a food ingredient is heat cooked using the oil and fat composition for heat cooking described above.

Furthermore, a sixth aspect of the present invention provides an agent for reducing oiliness of heat-cooked food, the agent including an n-3 edible oil and fat, in which the amount of n-3 fatty acids contained in the total amount of constituent fatty acids is 30 mass % or more and 80 mass % or less, as an active component.

In the agent for reducing oiliness of the heat-cooked food, it is preferred that the agent is used in such a manner that, when the heat-cooked food is cooked using an unheated oil and fat composition for heat cooking, the effective amount of the n-3 edible oil and fat with respect to the unheated oil and fat composition for heat cooking is 0.01 mass % or more and less than 1 mass % as the concentration in the oil and fat composition.

In the agent for reducing oiliness of the heat-cooked food, it is preferred that the agent is used in such a manner that, when the heat-cooked food is cooked using a previously heated oil and fat composition for heat cooking, the effective amount of the n-3 edible oil and fat with respect to the previously heated oil and fat composition for heat cooking is 0.01 mass % or more and less than 10 mass % as the concentration in the oil and fat composition.

Moreover, a seventh aspect of the present invention provides an agent for reducing odor of heat-cooked food, the agent including an n-3 edible oil and fat, in which the amount of n-3 fatty acids in a total amount of constituent fatty acids is 30 mass % or more and 80 mass % or less, as an active component.

In the agent for reducing an odor of the heat-cooked food, it is preferred that the agent is used in such a manner that, when the heat-cooked food is cooked using an unheated heated oil and fat composition for heat cooking, the effective amount of the n-3 edible oil and fat with respect to the unheated oil and fat composition for heat cooking is 0.01 mass % or more and less than 1 mass % as the concentration in the oil and fat composition.

In the agent for reducing odor of the heat-cooked food, it is preferred that the agent is used in such a manner that, when the heat-cooked food is cooked using a previously heated oil and fat composition for heat cooking, the effective amount of the n-3 edible oil and fat with respect to the previously heated oil and fat composition for heat cooking is 0.01 mass % or more and less than 10 mass % as the concentration in the oil and fat composition.

Effect of the Invention

In accordance with the present invention, it is possible to provide an oil and fat composition for heat cooking that has an exceptional effect of suppressing negative aspects caused by using edible oil and fat in heat cooking, and provide an edible material for the same. In particular, the oil and fat composition for heat cooking of the present invention has an exceptional effect of reducing the oiliness and odor of heat cooked foods obtained by heat cooking such as frying or stir-frying.

BEST MODE FOR CARRYING OUT THE INVENTION

The n-3 edible oil and fat used in the present invention refers to an edible oil and fat containing a high amount of n-3 (omega 3) fatty acid having an unsaturated bond in a carbon chain between the third and fourth carbons from the methyl group at the fatty acid n-terminal constituting the oil and fat. More specifically, the amount of n-3 fatty acids contained in the total amount of constituent fatty acids is 30 mass % or more and 80 mass % or less, preferably 35 mass % or more and 75 mass % or less, and more preferably 40 mass % or more and 70 mass % or less. When the amount is within the above range, the oiliness of the heat-cooked food can be effectively reduced and the odor can be reduced.

The term "oiliness" in the present invention refers to a perception composed of a combination of the aftertaste of oil remaining in the mouth after eating and the unpleasant oily flavor after cooking. The term "odor" in the present invention refers to an off-flavor in a heat-cooked food.

Examples of the n-3 edible oil and fat described above include flaxseed oil, perilla oil, Shiso oil, oil and fat containing docosahexaenoic acid (DHA) (fish oil), oil and fat containing eicosapentaenoic acid (EPA) (fish oil), as well as chia seed oil, algae oil, and microbial oil. Among these, one or more oils and fats selected from the group consisting of perilla oil, flaxseed oil, Shiso oil, oil and fat containing DHA, and oil and fat containing EPA are preferably used as the n-3 edible oil and fat. The amount of n-3 fatty acids contained in the total amount of constituent fatty acids can be measured in accordance with, e.g., the "Standard Methods for the Analysis of Fats, Oils and Related Materials 2.4.1.4-2013" by the Japan Oil Chemists' Society. Examples of the n-3 fatty acid included in the n-3 edible oil and fat include α-linolenic acid, docosahexaenoic acid (DHA), eicosapentaenoic acid (EPA), docosapentaenoic acid (DPA), and stearidonic acid, and such are usually composed of a variety of types. Therefore, the amount of n-3 fatty acids is the total content of these n-3 fatty acids.

Examples of edible oils and fats other than the n-3 edible oil and fat used in the present invention include rapeseed oil, corn oil, soybean oil, palm olein, sesame oil, peanut oil, sufflower oil, sunflower oil, cottonseed oil, grape seed oil, macadamia nut oil, hazelnut oil, walnut oil, pumpkin seed oil, camellia oil, tea seed oil, olive oil, rice bran oil, wheat germ oil, palm oil, palm kernel oil, coconut oil, cacao butter, beef fat, pork fat, chicken oil, milk fat, ester exchange oil of these oils and fats, hydrogenated oil, and fractionated oil. Among these, one or more oils and fats selected from the group consisting of rapeseed oil, corn oil, soybean oil, and palm olein are preferably included as the edible oil and fat other than the n-3 edible oil and fat used in the present invention.

The oil and fat composition for heat cooking of the present invention can be manufactured by mixing the n-3 edible oil and fat described above with a base oil and fat consisting of an edible oil and fat other than the n-3 edible oil and fat described above. Here, the n-3 edible oil and fat content of the oil and fat composition is 0.01 mass % or more and less than 1 mass %, preferably 0.02 mass % or more and 0.8 mass % or less, and more preferably 0.04 mass % or more and 0.8 mass % or less. When the amount is less than the above-stated range, the effect of the present invention cannot be sufficiently obtained, and when the amount exceeds the above-stated range, the flavor derived from n-3 edible oil and fat tends to be conspicuous, which is not preferred.

The oil and fat composition for heat cooking obtained in the manner described above can be used to heat cook a food ingredient to thereby manufacture a heat-cooked food. Here, heat-cooking includes frying (oil frying, deep fried), stir-frying, grilling, steaming, and boiling, and frying or stir-frying is preferred.

The heat-cooked food obtained by such cooking is not particularly limited; examples include pork cutlet, fried chicken, fried fish, tempura, croquette, French fries, chicken nuggets, donuts, hashed potatoes, corn dogs, fried tofu, fried bread, croutons, fried dough cakes, fried rice confectionery, snack confectionery, and instant noodles. Further examples include stir-fried vegetables, stir-fried liver, stir-fried leek, stir-fried sprouts, stir-fried rice, and other stir-fried foods, as well as hamburgers, gyoza, fried eggs, and other grilled foods.

The oil and fat composition for heat cooking obtained in the manner described above can be used to heat cook a food ingredient to thereby reduce the oiliness of the heat-cooked food. In other words, the oil and fat composition for heat cooking can be used in a method for reducing the oiliness of a heat-cooked food.

Also, the oil and fat composition for heat cooking obtained in the manner described above can be used to heat cook a food ingredient to thereby reduce the odor of the heat-cooked food. In other words, the oil and fat composition for heat cooking can be used in a method for reducing the odor of a heat-cooked food.

The n-3 edible oil and fat demonstrates an effect of reducing the oiliness of a cooked food during heat cooking. In other words, the n-3 edible oil and fat can be used as an active component of an agent for reducing the oiliness of a heat-cooked food.

Also, the n-3 edible oil and fat demonstrates an effect of reducing the odor of a cooked food during heat cooking. In other words, the n-3 edible oil and fat can be used as an active component of an agent for reducing the odor of a heat-cooked food.

At this time, the above-noted odor is generated from one or more food materials selected from those derived meat, fish, vegetable protein, and other food ingredients, and those derived from emulsifiers, pH adjusters, preservatives, bacteriostatic agents, and other additives.

The n-3 edible oil and fat content of the above-mentioned oiliness-reducing agent or odor-reducing agent is preferably greater than 15 mass %, more preferably 30 mass % or more, even preferably 40 mass % or more, and even more preferably 50 mass % or more. The upper limit of the content is not particularly limited and is 100 mass % or less. The effect of such reducing agent can be obtained within this range.

Further, the above-noted oiliness-reducing agent or odor-reducing agent may contain an edible oil and fat other than the above-noted n-3 edible oil and fat, and is preferably one or more oils and fats selected from rapeseed oil, corn oil, soybean oil, palm olein, sesame oil, safflower oil, sunflower oil, cottonseed oil, olive oil, rice bran oil, and is more preferably one or more oils and fats selected from rapeseed oil, corn oil, and soybean oil. The edible oil and fat content of the oiliness-reducing agent and the odor-reducing agent is not particularly limited, and the total amount of the n-3 edible oil and fat and other edible oils and fats can be 100% by mass or less.

The preferred mode of use of such an oiliness-reducing agent or odor-reducing agent may differ depending on whether an unheated edible oil and fat (hereinafter, also referred to as "unused oil") is used as a base oil and fat consisting of an edible oil and fat other than the above-noted n-3 edible oil and fat and the agent is added thereto, or whether a previously heated edible oil and fat (hereinafter, also referred to as "deteriorated oil") is used as a base oil consisting of an edible oil and fat other than the above-noted n-3 edible oil and fat and the agent is added thereto. The unheated edible oil and fat and the previously heated edible oil and fat include one or more oils and fats selected from edible oils and fats other than the above-noted n-3 edible oils and fats. Also, the unheated edible oil and fat and the previously heated edible oil and fat may be, in addition to edible oils and fats other than the n-3 edible oil and fat, an oil and fat composition for heat cooking that includes an n-3 edible oil and fat, emulsifier, antioxidant, silicone, colorant, etc.

Moreover, in a normal fry-cooking operation, so-called "oil supplementation" is performed in which an unused oil and fat composition for heat cooking is added between fry-cooking cycles to the oil and fat composition for heat cooking reduced by fry-cooking. With respect to 100 parts by mass of the heated edible oil and fat for heat cooking, the amount of supplemented oil is preferably 0 parts by mass or more and 50 parts by mass or less, more preferably 0 parts by mass or more and 40 parts by mass or less, and even preferably 0 parts by mass or more and 30 parts by mass or less. In the present specification, the oil and fat composition for heat cooking after "oil supplementation" has been carried out is deemed to be previously heated edible oil and fat.

In the present invention, when an unheated edible oil and fat is used, preferably the n-3 edible oil and fat in the resulting oil and fat composition for heat cooking reaches an amount of 0.01 mass % or more and less than 1 mass %, more preferably 0.02 mass % or more and 0.8 mass % or less, even more preferably 0.04 mass % or more and 0.8 mass % or less.

On the other hand, when a previously heated edible oil and fat is used, preferably the n-3 edible oil and fat in the resulting oil and fat composition for heat cooking reaches an amount of 0.01 mass % or more and 10 mass % or less, more preferably 0.02 mass % or more and 8 mass % or less, even more preferably 0.02 mass % or more and 6 mass % or less, and particularly preferably 0.04 mass % or more and 6 mass % or less.

In the present specification, the "previously heated" edible oil and fat or "deteriorated oil" refers to an edible oil and fat that is heated at a temperature of 80° C. or higher and 200° C. or lower, and has an acid value of greater than 0.2 and 10 or less. Also, the "unheated" edible oil and fat or "unused oil" refers to an edible oil or fat that has not been heated after being produced and has an acid value of 0.2 or less. The acid value referred to herein is measured in accordance with Standard Methods for the Analysis of Fats, Oils and Related Materials (2.3.1-2013 Acid values) by the Japan Oil Chemists' Society.

There is no particular limitation as to the mode in which the above-noted oil and fat composition for heat cooking, oiliness-reducing agent, and odor-reducing agent are used for heat cooking; heat cooking can be performed, as appropriate, in a desired manner using a method suitable for the cooked food to be applied. For example, when heat cooking is carried out using the oil and fat composition for heat cooking obtained by the present invention, the food ingredients may be heat cooked by frying or stir-frying in a state typically heated to 80° C. to 200° C., more typically 100° C. to 190° C.

An antioxidant, emulsifier, flavor, spice extract, antifoaming agent and other additives can be admixed with the above-noted oil and fat composition for heat cooking, oiliness-reducing agent, and odor-reducing agent as long as the effects of the present invention are not impaired.

Specific examples include ascorbic acid fatty acid ester, lignan, coenzyme Q, γ-oryzanol, tocopherol, silicone, coloring matter, and fatty acid.

EXAMPLES

Hereinbelow, the present invention will be described in greater detail using examples, but these examples do not limit the present invention in any way.

First, the base oil and fat and n-3 edible oil and fat used in the present example are enumerated below.

[1. Base Oil and Fat and n-3 Edible Oil and Fat]

(Base Oil)

Soybean oil: AJINOMOTO Rich and Umami Soybean Oil (manufactured by J-Oil Mills Inc.)

Rapeseed oil: AJINOMOTO Smooth Canola Oil (manufactured by J-Oil Mills Inc.)

Corn oil: AJINOMOTO Haiga no Megumi Corn Oil (manufactured by J-Oil Mills Inc.)

Palm olein: Iodine value 67, in-house preparation

High-oleic-acid rapeseed oil: in-house preparation

Deteriorated rapeseed oil: Deteriorated oil of J Canola Oil (manufactured by J-Oil Mills Co., Ltd.) prepared by the following method, the acid value of which is 0.424. 3.4 kg of J Canola Oil was loaded into an electric fryer FM-3HR (manufactured by Mach Kiki Co., Ltd.) and heated at 180° C. for 10 hours per day for a total of 30 hours. Deep-fried young chicken (Ajinomoto Frozen Foods Co., Inc., GX388) and New Potato Croquette 60 (Ajinomoto Frozen Foods Co., Inc., GC080) are used as food ingredients. The deep-fried young chicken was cooked under fry conditions of: a deep-frying mass of 400 g per deep-fry; a deep-frying time of 5 minutes per deep-fry, and a deep-frying cycle of 5 times per day (cooked on the first to third days). The New Potato Croquette 60 was cooked under the frying conditions of: a deep-fry number of 5 croquettes per deep-fry; a deep-frying time of 5 minutes per deep-fry; and a deep-frying cycle of 2 times per day (cooked on first day only). This cooked oil was recovered and used as deteriorated rapeseed oil.

(n-3 Edible Oil and Fat)

Perilla oil: Refined perilla oil (manufactured by Ota Oil Co., Ltd.)

Flaxseed oil: Refined flaxseed oil (manufactured by Ota Oil Co., Ltd.)

Shiso oil: Shiso oil Ichiban Shibori (manufactured by Benihana Foods Co., Ltd.)

DHA/EPA high-content composition: Stabilized DHA (manufactured by Fuji Oil Co., Ltd.)

[2. Fatty Acid Composition Analysis]

The fatty acid composition of each oil and fat was confirmed for the oils and fats shown in [1. Base oils and fats and n-3 edible oils and fats]. Specifically, methyl esterification was performed according to the Standard Methods for the Analysis of Fats, Oils and Related Materials 2.4.1.4-2013, and the amount of n-3 fatty acids ($\alpha$-linolenic acid, EPA, and DHA) in the total amount of constituent fatty acids of the oil and fat was measured. The analysis conditions were as follows.

(Analysis Conditions)

Device name: GC-2010 plus (Shimadzu Corporation)

Column: TC-70 (length 30 m, inside diameter 0.25 mm, liquid-phase film thickness 0.25 μm) manufactured by GL Sciences Inc.

Column temperature increase conditions: See Table 1

TABLE 1

| Column temperature increase conditions | | |
|---|---|---|
| Temperature increase | Temperature | Maintained |
| — | 80° C. | 2 min. |
| 35° C./min. | 160° C. | — |
| 2° C./min. | 185° C. | — |
| 5° C./min | 230° C. | 8 min. |

Column pressure: 79.7 kPa/min

Carrier gas: $N_2$

Vaporization chamber temperature: 230° C.

FID temperature: 240° C.

Split ratio: 1:50

Injection amount: 1 μL

As a result, as shown in Table 2, the amount (mass %) of n-3 fatty acids ($\alpha$-linolenic acid, EPA, and DHA) in the total amount of constituent fatty acids of oil and fat is about 10 mass % or less in the base oil and fat, and about 50 mass % or more in the n-3 edible oil and fat.

TABLE 2

| Amount (mass %) of n-3 fatty acid in the total amount of constituent fatty acids | | | | |
|---|---|---|---|---|
| | | C18:3 $\alpha$-linolenic acid | C20:5 EPA | C22:6 DHA |
| Base oil and fat | Soybean oil | 6.5 | (—)[1] | (—)[1] |
| | Rapeseed oil | 8.2 | (—)[1] | (—)[1] |
| | Corn oil | 0.8 | (—)[1] | (—)[1] |
| | Palm olein | 0.1 | (—)[1] | (—)[1] |
| | High-oleic-acid rapeseed oil | 2.1 | (—)[1] | (—)[1] |
| n-3 edible oil and fat | Perilla oil | 58 | (—)[1] | (—)[1] |
| | Flaxseed oil | 54.5 | (—)[1] | (—)[1] |
| | Shiso Oil | 55.3 | (—)[1] | (—)[1] |
| | DHA/EPA high-content composition | 0.8 | 22.4 | 33.8 |

(—)[1]: Not detected

[3. Food Ingredients and Cooking Method for Heat-Cooked Foods]

The food ingredients and cooking method for heat-cooked foods are as follows.

(1) Pork Cutlet 400 g of the oil and fat composition to be tested was placed into a pan, the pan was heated at 170° C. for 1 hour without cooking, a frozen pork cutlet (product name: Soft Pork Cutlet 120, manufactured by Ajinomoto Frozen Foods Co., Inc.) was added and deep-fried for 4 minutes at the same temperature, and then turned over and deep-fried for 4 minutes and 30 seconds. The pork cutlet was allowed to rest on a mesh for 30 minutes to drain oil, and then a sensory evaluation was performed.

(2) Stir-Fried Vegetables 14 g of the oil and fat composition to be tested was placed into a frying pan, the pan was heated on high heat for 1 minute and 30 seconds without cooking, 150 g of mixed vegetables (cabbage, sprouts, and carrots) was added and stir fried for 2 minutes, 1 g of salt was added, and the mixture was stir fried for one more minute. The stir-fried vegetables were transferred to a plate and allowed to rest for 10 minutes, and subjected to a sensory evaluation.

(3) Deep-Fried Chicken

Chicken thigh meat was cut into 33 to 35 g portions, soaked in sake and set aside for 3 hours, then soaked in soy sauce and set aside for 15 minutes, and then sprinkled with potato starch to prepare the ingredients. Using the same method for cooking the pork cutlet, the oil and fat composition to be tested was placed into a pan, the pan was heated at 170° C. for 1 hour without cooking, the prepared ingredients were added and deep fried for 7 minutes and 30 seconds at the same temperature. The deep-fried chicken was allowed to rest on a mesh for 30 minutes to drain oil, and then a sensory evaluation was performed.

(4) Deep-Fried Horse Mackerel 400 g of the oil and fat composition to be tested was placed into a pan, the pan was heated at 170° C. for 1 hour without cooking, a single frozen horse mackerel (Yachiyo Shoji Co., Ltd.) was added and deep fried for 4 minutes at the same temperature. The deep-fried horse mackerel was allowed to rest on a mesh for 30 minutes to drain oil, and then a sensory evaluation was performed.

(5) Deep-Fried Whitefish (Cooking 1)

400 g of the oil and fat composition to be tested was placed into a pan, the pan was heated at 170° C. for 1 hour without cooking, a single frozen whitefish (Yachiyo Shoji Co., Ltd.) was added and deep fried for 4 minutes at the same temperature. The whitefish was allowed to rest on a mesh for 30 minutes to drain oil, and then a sensory evaluation was performed.

(6) Deep-Fried Whitefish (Cooking 2)

400 g of the oil and fat composition to be tested was placed into a pan, the pan was heated to 170° C. without cooking, two frozen whitefish (Yachiyo Shoji Co., Ltd.) were added and deep fried for 7 minutes and 30 seconds at the same temperature. The whitefish was allowed to rest on a mesh for 10 minutes, and then placed on the top shelf (72° C. to 73° C.) of a warm-storage showcase, the place was changed every hour to and from the middle shelf, and stored for 4 hours or 6 hours. After storage, a sensory evaluation was performed.

(7) Potato Croquette 400 g of the oil and fat composition to be tested was placed into a pan, the pan was heated to 170° C. without cooking, and two New Potato Croquettes (Ajinomoto Frozen Foods Co., Inc. GC080) were added and deep fried for 9 minutes and 30 seconds at the same temperature. The potato croquettes were allowed to rest on a mesh for 10 minutes, and then placed on the middle shelf of the warm-storage showcase while placed the above-described fried whitefish on the top shelf. The potato croquettes placed on the middle shelf were changed in the place every hour with the fried whitefish, and the potato croquettes were stored for 4 hours or 6 hours. After storage, a sensory evaluation was performed.

[Test Example 1] (Study of Pork Cutlet and the Added Amount of Perilla Oil)

Soybean oil was used as the base oil and fat, and perilla oil, which is an n-3 edible oil and fat, was added or not added so as to constitute the amount (mass %) shown in Table 5 below, and the oil and fat composition for heat cooking of each example and comparative example was prepared. Next, a pork cutlet was cooked by the above-described cooking method using the oil and fat composition for heat cooking of each example and comparative example.

The pork cutlet that had been set aside for 30 minutes after cooking was sampled by four expert panelists, and a sensory evaluation was performed on the light taste and the negative flavor of the oil. In the sensory evaluation, the case in which an n-3 edible oil and fat is not added was used as a "reference," the average score was calculated by scoring in accordance with the 7-step evaluation criteria shown in Table 3 below, and the average score was further ranked in accordance with the standard shown in Table 4 below to make a final evaluation. In the sensory evaluation, the items "light taste" as an aftertaste that the oil remains in the mouth when eaten, and "negative flavor of the oil" as an unpleasant oil flavor after heat cooking were provided in order to evaluate oiliness.

TABLE 3

| | Light taste | | Negative flavor of oil |
|---|---|---|---|
| 7 | Feeling that absolutely no oil remains in the mouth | 7 | Unpleasant flavor of oil is very strong |
| 6 | Feeling that no oil remains in the mouth | 6 | Unpleasant flavor of oil is strong |
| 5 | Feeling that mostly no oil remains in the mouth | 5 | Unpleasant flavor of oil is slightly strong |

TABLE 3-continued

| | Light taste | | Negative flavor of oil |
|---|---|---|---|
| 4 | Reference | 4 | Reference |
| 3 | Slight feeling that oil slightly remains in the mouth | 3 | Unpleasant flavor of oil is slightly weak |
| 2 | Feeling that oil remains in the mouth | 2 | Unpleasant flavor of oil is weak |
| 1 | Considerable feeling that oil remains in the mouth | 1 | Unpleasant flavor of oil is very weak |

TABLE 4

| Light taste | Negative flavor of oil |
|---|---|
| 6 ≤ S | 0 < S ≤ 2.5 |
| 5.5 ≤ A < 6 | 2.5 < A ≤ 3 |
| 5 ≤ B < 5.5 | 3 < B ≤ 3.5 |
| 4.5 ≤ C < 5 | 3.5 < C < 4 |
| 4 < D < 4.5 | 4 = No effect (D) |
| No effect (E) ≤ 4 | 4 < E |

TABLE 5

| | Oil and fat composition | | | Evaluation of pork cutlet | |
|---|---|---|---|---|---|
| | | n-3 edible oil and fat | | | Negative |
| | Base oil and fat | Additive oil and fat | Content (mass%) | Light taste | flavor of oil |
| Comparative example 1-1 | Soybean oil | — | 0 | Reference | Reference |
| Example 1-1 | | Perilla oil | 0.01 | C | B |
| Example 1-2 | | | 0.03 | B | B |
| Example 1-3 | | | 0.06 | A | B |
| Example 1-4 | | | 0.1 | A | S |
| Example 1-5 | | | 0.3 | A | A |
| Example 1-6 | | | 0.8 | A | A |
| Comparative example 1-2 | | | 3 | A | E |

As a result, as shown in Table 5, examples in which perilla oil was added so as to constitute an amount of 0.01 to 0.8 mass % (Examples 1-1 to 1-6) were compared with an example in which no perilla oil was added (Comparative Example 1-1), and the evaluation was better in terms of improving the lightness and suppressing the negative flavor of oil. On the other hand, when perilla oil was added so as to constitute an amount of 3 mass % (Comparative Example 1-2), an unpleasant fishy flavor was perceived, and accordingly, the evaluation was worse than that without perilla oil added (Comparative Example 1-1) in terms of suppressing the negative flavor of the oil.

In view of the foregoing, it is apparent that by using a specific amount of perilla oil, the effect of improving the lightness of the fried food and suppressing the negative flavor of the oil can be obtained, and the oiliness of the fried food can be reduced.

[Test Example 2] (Study of Stir-Fried Vegetables and the Added Amount of Perilla Oil)

Soybean oil was used as the base oil and fat, and perilla oil, which is an n-3 edible oil and fat, was added or not added so as to constitute the amount (mass %) shown in Table 6 below, and the oil and fat composition for heat cooking of each example and comparative example was prepared. Next, stir-fried vegetables were cooked by the above-described cooking method using the oil and fat composition for heat cooking of each example and comparative example.

The stir-fried vegetables that had been set aside for 10 minutes after cooking were sampled by four expert panelists, and a sensory evaluation was performed in the same manner as Test example 1 for the light taste and the negative flavor of the oil.

TABLE 6

| | Oil and fat composition | | | Evaluation of stir-fried vegetables | |
| | | n-3 edible oil and fat | | | Negative |
| | Base oil and fat | Additive oil and fat | Content (mass%) | Light taste | flavor of oil |
| Comparative example 2-1 | Soybean oil | — | 0 | Reference | Reference |
| Example 2-1 | | Perilla oil | 0.3 | B | C |
| Example 2-2 | | | 0.8 | B | C |

As a result, as shown in Table 6, stir-fried vegetables in which perilla oil was added so as to constitute an amount of 0.3 and 0.8 mass % (Examples 2-1 to 2-2) in the same manner as when the pork cutlet was cooked in Test example 1 were compared with those in which no perilla oil was added (Comparative Example 2-1), and the evaluation was better in terms of improving the lightness and suppressing the negative flavor of oil.

In view of the foregoing, it is apparent that by using a specific amount of perilla oil, the effect of improving the lightness of the heat-cooked food and suppressing the negative flavor of the oil can be obtained, and as a result, the oiliness of the heat-cooked food can be reduced, regardless of the type of food ingredient and mode of cooking.

[Test Example 3] (Study of Pork Cutlet and the Type of Base Oil)

The various types of edible oil and fat shown in Table 7 were used, and perilla oil, which is an n-3 edible oil and fat, was added or not added so as to constitute the amount (mass %) shown in Table 7 below to prepare the oil and fat composition for heat cooking of each example and comparative example, and other than using the foregoing, a sensory evaluation was performed using the same method as Test example 1 for the light taste and the negative flavor of the oil when a pork cutlet was cooked.

TABLE 7

| | Oil and fat composition | | | Evaluation of pork cutlet | |
| | | n-3 edible oil and fat | | | Negative |
| | Base oil and fat | Additive oil and fat | Content (mass%) | Light taste | flavor of oil |
| Comparative example 3-1 | Rapeseed oil | — | 0 | Reference | Reference |
| Example 3-1 | | Perilla oil | 0.3 | B | B |
| Comparative example 3-2 | Corn oil | — | 0 | Reference | Reference |
| Example 3-2 | | Perilla oil | 0.3 | A | B |
| Comparative example 3-3 | Palm olein | — | 0 | Reference | Reference |

TABLE 7-continued

| | Oil and fat composition | | | Evaluation of pork cutlet | |
| | | n-3 edible oil and fat | | | Negative |
| | Base oil and fat | Additive oil and fat | Content (mass%) | Light taste | flavor of oil |
| Example 3-3 | | Perilla oil | 0.1 | C | B |

As a result, as shown in Table 7, examples in which rapeseed oil, corn oil, palm olein were used as the base oil and fat, and perilla oil was added (Examples 3-1 to 3-3) were compared with examples in which perilla oil was not added (Comparative Examples 3-1 to 3-3), and the evaluation was better in terms of improving the lightness and suppressing the negative flavor of oil.

In view of the foregoing, it is apparent that the effect of perilla oil can be obtained regardless of the type of edible oil and fat used as the base oil and fat.

[Test Example 4] (Study of Pork Cutlet and the Type of Added Oil and Fat)

The various types of n-3 edible oil and fat shown in Table 8 were used as an additive oil, and the oil and fat compositions for heat cooking of the examples and comparative example were prepared by adding or not adding an additive oil to soybean oil so as to constitute the amount (mass %) shown in Table 8 below, and other than using these examples and comparative example, a sensory evaluation was performed with the same method as Test example 1 for the light taste and the negative flavor of the oil when a pork cutlet was cooked.

TABLE 8

| | Oil and fat composition | | | Evaluation of pork cutlet | |
| | | n-3 edible oil and fat | | | Negative |
| | Base oil and fat | Additive oil and fat | Content (mass%) | Light taste | flavor of oil |
| Comparative example 4-1 | Soybean oil | — | 0 | Reference | Reference |
| Example 4-1 | | Perilla oil | 0.1 | A | S |
| Example 4-2 | | Flaxseed oil | 0.1 | B | A |
| Example 4-3 | | Shiso oil | 0.1 | B | A |
| Example 4-4 | | DHA/EPA high-content comp. | 0.1 | B | B |

As a result, as shown in Table 8, examples in which soybean oil was used as the base oil and fat, and in which various n-3 edible oils and fats were added as the additive oils and fats (Examples 4-1 to 4-4) were compared with an example in which an n-3 edible oil and fat was not added (Comparative Example 4-1), and the evaluation each example was better in terms of improving the lightness and suppressing the negative flavor of oil.

In view of the foregoing, it is apparent that by using a specific amount of n-3 edible oil and fat, the effect of improving the lightness of the heat-cooked food and suppressing the negative flavor of the oil can be obtained, and the oiliness of the heat-cooked food can be reduced.

[Test Example 5] (Study of Pork Cutlet, Type of Base Oil and Fat, and Added Amount of Additive Oil and Fat)

The oil and fat compositions for heat cooking of the examples and comparative example were prepared using the base oil and fat, additive oil and fat, and amounts (mass %) thereof shown in Table 9, and other than using these examples and comparative examples, a sensory evaluation was performed with the same method as Test example 1 for the light taste and the negative flavor of the oil when a pork cutlet was cooked.

TABLE 9

| | Oil and fat composition | | | Evaluation of pork cutlet | |
| | | n-3 edible oil and fat | | | Negative |
| | Base oil and fat | Additive oil and fat | Content (mass%) | Light taste | flavor of oil |
|---|---|---|---|---|---|
| Comparative example 5-1 | Blended oil (High-oleic- acid rapeseed oil: corn oil = 3:7) | — | 0 | Reference | Refer- ence |
| Example 5-1 | | Perilla oil | 0.1 | B | B |
| Comparative example 5-2 | | | 3 | C | E |
| Example 5-2 | | Flaxseed oil | 0.1 | B | C |
| Comparative example 5-3 | | | 3 | C | E |

As a result, as shown in Table 9, examples of a blended oil containing high-oleic-acid rapeseed oil and corn oil in a ratio of 3:7 is used as a base oil and fat, and in which perilla oil or flaxseed oil, which are n-3 edible oils and fats, were added to the base oil so as to constitute an amount of 0.1 mass % (Examples 5-1 and 5-2) were compared with an example (Comparative example 5-1) in which perilla oil and flaxseed oil were not added, and the evaluation was better in terms of improving the lightness and suppressing the negative flavor of oil. On the other hand, when perilla oil or flaxseed oil were added so as to constitute an amount of 3 mass % (Comparative Examples 5-2 and 5-3), an unpleasant fishy flavor was perceived, and accordingly, the evaluation was worse than that without perilla oil and flaxseed oil added (Comparative Example 5-1) in terms of suppressing the negative flavor of the oil.

In view of the foregoing, it is apparent that in order to obtain the effect of improving the lightness and suppressing the negative flavor of oil of heat-cooked food by the use of perilla oil and flaxseed oil, in other words, in order to obtain an "oiliness reducing effect," it is important to bring the amount thereof to less than 3 mass %. The oil and fat composition of Comparative example 5-3 is very similar to the oil and fat composition described in Example 6 of Japanese Laid-Open Patent Application No. 2018-7572, but cannot be considered to be the oil and fat composition according to an implementation of the present invention. In other words, according to the foregoing, it is apparent that the present invention is different from the oil and fat composition for obtaining a heat-cooked food having the moderate flavor and richness disclosed in said publication, and demonstrates a unique effect of improving the lightness and suppressing the negative flavor of the oil of the heat-cooked food, that is, reducing the oiliness.

[Test Example 6] (Study of the Odor-Reducing Effect of Food Ingredients by Using Perilla Oil)

Soybean oil was used as the base oil and fat, and perilla oil, which is an n-3 edible oil and fat, was added so as to be 0.3 mass % or was not added, and the oil and fat composition for heat cooking of each example and comparative example was prepared. Next, a pork cutlet, deep-fried chicken, and fried horse mackerel were cooked by the above-described cooking method using the oil and fat composition for heat cooking of each example and comparative example.

The cooked foods that were allowed to rest for 30 minutes after cooking were sampled by four expert panelists, and a sensory evaluation was performed on the odor of the food ingredients of the pork cutlet, deep-fried chicken, and fried horse mackerel. In the sensory evaluation, the case in which an n-3 edible oil and fat is not added was used as a "reference," the average score was calculated by scoring in accordance with the 7-step evaluation criteria shown in Table 10 below, and the average score was further ranked in accordance with the standard shown in Table 11 below to make a final evaluation.

TABLE 10

| Odor of food ingredients | |
|---|---|
| 7 | Strong odor of meat/fish |
| 6 | Odor of meat/fish |
| 5 | Slight odor of meat/fish |
| 4 | Reference |
| 3 | Almost no odor of meat/fish |
| 2 | Hardly any odor of meat/fish |
| 1 | Completely no odor of meat/fish |

TABLE 11

| Masking of odor of food ingredients |
|---|
| $0 < S \le 2.5$ |
| $2.5 < A \le 3$ |
| $3 < B \le 3.5$ |
| $3.5 < C < 4$ |
| 4 = No effect (D) |
| $4 < E$ |

TABLE 12

| | | Oil and fat composition | | | |
| | | | n-3 edible oil and fat | | Evaluation |
| | Deep fry type | Base oil and fat | Additive oil and fat | Content (mass%) | Order of food ingredients |
|---|---|---|---|---|---|
| Comparative example 6-1 | Pork cutlet | Soybean oil | — | 0 | Reference |
| Example 6-1 | | | Perilla oil | 0.3 | S |
| Comparative example 6-2 | Fried chicken | | — | 0 | Reference |

TABLE 12-continued

| | | Oil and fat composition | | | Evaluation |
| | | | n-3 edible oil and fat | | |
| | Deep fry type | Base oil and fat | Additive oil and fat | Content (mass%) | Order of food ingredients |
|---|---|---|---|---|---|
| Example 6-2 | | | Perilla oil | 0.3 | B |
| Comparative example 6-3 | Fried horse mackerel | | — | 0 | Reference |
| Example 6-3 | | | Perilla oil | 0.3 | A |

As a result, examples in which perilla oil was added so as to constitute an amount of 0.3 mass % (Examples 6-1 to 6-3) were compared with examples in which perilla oil was not added (Comparative examples 6-1 to 6-3), and each resulted in better evaluations in terms of reducing the odor of each food ingredient.

In view of the foregoing, it is apparent that by using perilla oil, the odor of heat-cooked food and, in particular, the odor derived from the food ingredients can be reduced without regard to the type of food ingredient and the mode of cooking.

[Test Example 7] (Study of the Use of an Oiliness-Reducing Agent)

First, an agent for reducing the oiliness of heat-cooked foods was prepared using the blends shown in Table 13 below. Next, deteriorated rapeseed oil was used as the base oil and fat, and the oiliness-reducing agent was added so that the perilla oil, which is an n-3 edible oil and fat, had the content (mass %) shown in Table 13 below, the oil and fat composition for heat cooking of each example and comparative example was prepared, and a pork cutlet and fried whitefish were cooked using the above-described cooking method (the fried whitefish as cooked in accordance with Cooking 1).

The pork cutlet and fried whitefish that had been set aside for 30 minutes after cooking were sampled by expert panelists, and a sensory evaluation was performed in the same manner as Test example 1 for the light taste and the negative flavor of the oil. The sensory evaluation of each example was performed by four expert panelists for Example 7-1 with reference to Comparative Example 7-2, and by two expert panelists for Examples 7-2 to 7-4 with reference to Comparative Example 7-1.

As a result, as shown in Table 13, when deteriorated rapeseed oil is used as the base oil and fat, the lightness of the cooked food is improved and the negative flavor of the oil is suppressed by adding an oiliness-reducing agent having an n-3 edible oil and fat as an active component so that the n-3 edible oil and fat content of the oil and fat composition is 0.4 mass % to 7 mass % (Examples 7-1 to 7-4), and as a result, the effect of reducing oiliness was observed.

In view of the foregoing, it is apparent that when a deteriorated oil is used as the base oil and fat it is possible to obtain an oiliness-reducing effect for heat-cooked foods by bringing the n-3 edible oil and fat content in an oil and fat composition to 0.4 mass % or more and 7 mass %.

[Test Example 8] (Study of the Use of an Odor-Reducing Agent)

First, an agent for reducing the odor of heat-cooked foods was prepared using the blends shown in Table 14 below.

Next, deteriorated rapeseed oil was used as the base oil and fat, and the odor-reducing agent was added so that the perilla oil, which is an n-3 edible oil and fat, constituted the amount (mass %) shown in Table 14 below, the oil and fat composition for heat cooking of each example and comparative example was prepared, and a pork cutlet and fried whitefish were cooked using the above-described cooking method (the fried whitefish was cooked in accordance with Cooking 1).

The pork cutlet and fried whitefish that had been set aside for 30 minutes after cooking were sampled by expert panelists, and a sensory evaluation was performed in the same manner as Test example 6 for the odor of the food ingredients. The sensory evaluation of each example was performed by four expert panelists for Example 8-1 with reference to Comparative Example 8-2, and by two expert panelists for Examples 8-2 to 8-4 with reference to Comparative Example 8-1.

TABLE 13

| | | Oil and fat composition | | | | | Evaluation of pork cutlet | | Evaluation of fried whitefish | |
| | | Oiliness-reducing agent | | | Content | Content | | | | |
| | Base oil and fat | n-3 edible oil and fat (parts by mass) | Edible oil and fat (parts by mass) | | (mass %) of reducing agent | (mass %) of n-3 edible oil and fat | Light taste | Negative flavor of oil | Light taste | Negative flavor of oil |
|---|---|---|---|---|---|---|---|---|---|---|
| Comparative example 7-1 | Deteriorated rapeseed oil | Perilla oil | — | Rape-seed oil | 28 | 7 | 0 | Reference | Reference | Reference | Reference |
| Comparative example 7-2 | | | — | | 40 | 10 | 0 | (Not tested) | (Not tested) | Reference | Reference |
| Example 7-1 | | | 1.6 | | 38.4 | 10 | 0.4 | (Not tested) | (Not tested) | A | S |
| Example 7-2 | | | 3.2 | | 24.8 | 7 | 0.8 | A | A | A | S |
| Example 7-3 | | | 12 | | 16 | 7 | 3 | B | B | B | A |
| Example 7-4 | | | 28 | | — | 7 | 7 | B | D | C | B |

TABLE 14

| | Oil and fat composition | | | | | | | |
| | | Odor-reducing agent | | Content | Content | Evaluation of | Evaluation of |
| | Base oil and fat | n-3 edible oil and fat (parts by mass) | Edible oil and fat (parts by mass) | (mass %) of reducing agent | (mass %) of n-3 edible oil and fat | pork cutlet Odor of food ingredients | fried whitefish Odor of food ingredients |
|---|---|---|---|---|---|---|---|
| Comparative example 8-1 | Deteriorated rapeseed oil | Perilla oil | — Rapeseed oil 28 | 7 | 0 | Reference | Reference |
| Comparative example 8-2 | | | — 40 | 10 | 0 | (Not tested) | Reference |
| Example 8-1 | | 1.6 | 38.4 | 10 | 0.4 | (Not tested) | S |
| Example 8-2 | | 3.2 | 24.8 | 7 | 0.8 | S | S |
| Example 8-3 | | 12 | 16 | 7 | 3 | A | A |
| Example 8-4 | | 28 | — | 7 | 7 | D | B |

As a result, as shown in Table 14, when deteriorated rapeseed oil is used as the base oil and fat, the odor of the food ingredients in the heat-cooked food is suppressed by adding an odor-reducing agent having an n-3 edible oil and fat as an active component so that the n-3 edible oil and fat content of the oil and fat composition is 0.4 mass % to 7 mass % (Examples 8-1 to 8-4).

In view of the foregoing, it is apparent that when a deteriorated oil is used as the base oil and fat, it is possible to obtain an odor-reducing effect for heat-cooked foods by bringing the content of the n-3 edible oil and fat in an oil and fat composition to 0.4 mass % or more and 7 mass % or less.

[Test Example 9] (Study of Potato Croquettes and Post Warm Storage)

The blended oils shown in Table 15 were used as the base oil and fat, and perilla oil or flaxseed oil, which are n-3 edible oils and fats, were added so as to be 0.8 mass %, or were not added, and the oil and fat composition for heat cooking of each example and comparative example was prepared. Next, a potato croquette was cooked by the above-described cooking method using the oil and fat composition for heat cooking of each example and comparative example.

The potato croquette that had been set aside for 10 minutes after cooking, and potato croquette that had been stored 4 to 6 hours in a warm-storage showcase after cooking were sampled by five expert panelists, and a sensory evaluation was performed in the same manner as Test example 1 for the light taste and the negative flavor of the oil.

As a result, as shown in Table 15, examples in which a blended oil containing high-oleic-acid rapeseed oil, palm olein, and soybean oil in a ratio of 2:2:6 was used as a base oil and fat, and in which perilla oil or flaxseed oil, which are n-3 edible oils and fats, were added so as to constitute an amount of 0.8 mass % (Examples 9-1 and 9-2) were compared with an example (Comparative example 9-1) in which perilla oil and flaxseed oil were not added, and after manufacture and subsequent storage of 4 and 6 hours, the evaluation was better in terms of improving the lightness and suppressing the negative flavor of oil. For example, in comparison with an example of a stored product in which the perilla oil and flaxseed oil are not added (Comparative example 9-1), the evaluation score was improved in each category for products to which 0.8 mass % of perilla oil or flaxseed oil had been added and stored for 4 and 6 hours.

In view of the foregoing, it is apparent that by using a specific amount of perilla oil or flaxseed oil, the effect of improving the lightness of the fried food and suppressing the negative flavor of the oil can be obtained, and the oiliness of the fried food can be reduced even when the cooked product is stored in a warm-storage showcase for a predetermined amount of time.

[Test Example 10] (Study of Fried Whitefish and Post Warm Storage)

The blended oils shown in Table 16 were used as the base oil and fat, and perilla oil or flaxseed oil, which are n-3 edible oils and fats, were added so as to be 0.8 mass %, or

TABLE 15

| | Oil and fat composition | | | | Evaluation of potato croquette | |
| | | n-3 edible oil and fat | | | | |
| | Base oil and fat | Additive oil and fat | Content (mass %) | Storage time (h) | Light taste | Negative flavor of oil |
|---|---|---|---|---|---|---|
| Comp. example 9-1 | Blended oil (High-oleic-acid | — | 0 | 0 | Reference | Reference |
| | | | | 4 | D | E |
| | | | | 6 | E | E |
| Example 9-1 | rapeseed oil:palm olein: | Perilla oil | 0.8 | 0 | B | S |
| | | | | 4 | C | A |
| | | | | 6 | D | C |
| Example 9-2 | soybean oil = 2:2:6) | Flaxseed oil | 0.8 | 0 | B | S |
| | | | | 4 | B | S |
| | | | | 6 | D | B | were not added, and the oil and fat composition for heat cooking of each example and comparative example was prepared. Next, fried whitefish were cooked by the above-described cooking method using the oil and fat composition for heat cooking of each example and comparative example (in accordance with Cooking 2).

The fried whitefish that had been set aside for 10 minutes after cooking, and fired whitefish that had been stored 4 to 6 hours in a warm-storage showcase after cooking were sampled by five expert panelists, and a sensory evaluation was performed in the same manner as Test example 1 for the light taste and the negative flavor of the oil. Furthermore, a sensory evaluation was performed in the same manner as Test example 6 for the odor of the food ingredients of the fried whitefish.

TABLE 16

| | Oil and fat composition | | | | Evaluation of fried whitefish | | |
|---|---|---|---|---|---|---|---|
| | Base oil and fat | n-3 edible oil and fat: Additive oil and fat | n-3 edible oil and fat: Content (mass %) | Storage time (h) | Light taste | Negative flavor of oil | Odor of food ingredients |
| Comparative example 10-1 | Blended oil (High-oleic-acid rapeseed oil:palm olein: soybean oil = 2:2:6) | — | 0 | 0 | Reference | Reference | Reference |
| | | | | 4 | D | E | E |
| | | | | 6 | E | E | E |
| Example 10-1 | | Perilla oil | 0.8 | 0 | B | A | A |
| | | | | 4 | C | B | C |
| | | | | 6 | D | C | C |
| Example 10-2 | | Flaxseed oil | 0.8 | 0 | A | S | S |
| | | | | 4 | B | A | B |
| | | | | 6 | C | B | C |

As a result, as shown in Table 16, examples in which a blended oil containing high-oleic-acid rapeseed oil, palm olein, and soybean oil in a ratio of 2:2:6 is used as a base oil and fat, and in which perilla oil or flaxseed oil, which are n-3 edible oils and fats, were added so as to constitute an amount of 0.8 mass % (Examples 10-1 and 10-2) were compared with an example (Comparative example 10-1) in which perilla oil and flaxseed oil were not added, and after manufacture and then storage of 4 and 6 hours, the evaluation was better in terms of improving the lightness, suppressing the negative flavor of oil, and reducing the odor of food ingredients. For example, in comparison with an example of a stored product in which the perilla oil and flaxseed oil are not added (Comparative example 10-1), the evaluation score was improved in each category for products to which 0.8 mass % of perilla oil or flaxseed oil has been added and stored for 4 and 6 hours.

In view of the foregoing, it is apparent that by using a specific amount of perilla oil or flaxseed oil, the effect of improving the lightness of the fried food and suppressing the negative flavor of the oil can be obtained, and the oiliness of the fried food can be reduced for a stored product that has been stored in a warm-storage showcase for a predetermined amount of time, even for fried whitefish in the same manner as the potato croquette shown in Test example 9. It is furthermore apparent that the odor-reducing effect for food ingredients can be obtained for a stored product that has been stored in a warm-storage showcase.

The invention claimed is:

1. An oil and fat composition for heat cooking containing an n-3 edible oil and fat in which the amount of n-3 fatty acids contained in the total amount of constituent fatty acids is 30 mass % or more and 80 mass % or less, and a base oil and fat consisting of an edible oil and fat other than the n-3 edible oil and fat, the oil and fat composition being characterized in that 0.01 mass % or more and less than 1 mass % of the n-3 edible oil and fat is contained in the oil and fat composition, wherein the n-3 edible oil and fat is one or more oils and fats selected from the group consisting of perilla oil, flaxseed oil, and Shiso oil.

2. The oil and fat composition for heat cooking according to claim 1, wherein the base oil and fat contains one or more oils and fats selected from the group consisting of rapeseed oil, corn oil, soybean oil, and palm olein.

3. The oil and fat composition for heat cooking according to claim 1, wherein the heat cooking is frying or stir-frying.

4. A method of manufacturing an oil and fat composition for heat cooking including a step for mixing an n-3 edible oil and fat in which the amount of n-3 fatty acids contained in the total amount of constituent fatty acids is 30 mass % or more and 80 mass % or less, and a base oil and fat consisting of an edible oil and fat other than the n-3 edible oil and fat, the method of manufacturing an oil and fat composition being characterized in that 0.01 mass % or more and less than 1 mass % of the n-3 edible oil and fat is contained in the oil and fat composition for heat cooking, wherein the n-3 edible oil and fat is one or more oils and fats selected from the group consisting of perilla oil, flaxseed oil, and Shiso oil.

5. A method of manufacturing a heat-cooked food, characterized in that the method includes a step for heat cooking a food ingredient using the oil and fat composition for heat cooking according to claim 1.

6. A method of reducing oiliness of heat-cooked food in which a food ingredient is heat cooked using the oil and fat composition for heat cooking according to claim 1.

7. A method of reducing an odor of a heat-cooked food in which a food ingredient is heat cooked using the oil and fat composition for heat cooking according to claim 1.

8. An agent for reducing oiliness of heat-cooked food, the agent comprising the oil and fat composition for heat cooking according to claim 1.

9. The agent for reducing oiliness of the heat-cooked food according claim 8, which is used in such a manner that, when the heat-cooked food is cooked using an unheated oil and fat composition for heat cooking, the effective amount of the n-3 edible oil and fat with respect to the unheated oil and fat composition for heat cooking is 0.01 mass % or more and less than 1 mass % as the concentration in the oil and fat composition.

10. The agent for reducing oiliness of the heat-cooked food according claim 8, which is used in such a manner that, when the heat-cooked food is cooked using a previously heated oil and fat composition for heat cooking, the effective amount of the n-3 edible oil and fat with respect to the previously heated oil and fat composition for heat cooking is 0.01 mass % or more and less than 10 mass % as the concentration in the oil and fat composition.

11. An agent for reducing an odor of heat-cooked food, the agent comprising the oil and fat composition for heat cooking according to claim 1.

12. The agent for reducing odor of the heat-cooked food according claim 11, which is used in such a manner that, when the heat-cooked food is cooked using an unheated oil and fat composition for heat cooking, the effective amount of the n-3 edible oil and fat with respect to the unheated oil and fat composition for heat cooking is 0.01 mass % or more and less than 1 mass % as the concentration in the oil and fat composition.

13. The agent for reducing odor of the heat-cooked food according claim 11, which is used in such a manner that, when the heat-cooked food is cooked using a previously heated oil and fat composition for heat cooking, the effective amount of the n-3 edible oil and fat with respect to the previously heated oil and fat composition for heat cooking is 0.01 mass % or more and less than 10 mass % as the concentration in the oil and fat composition.

14. The oil and fat composition for heat cooking according to claim 2, wherein the heat cooking is frying or stir-frying.

* * * * *